United States Patent Office 2,779,418
Patented Jan. 29, 1957

2,779,418

METHOD OF INCREASING PRODUCTION FROM WELLS

Arthur W. Garst, Tulsa, Okla., assignor to Stanolind Oil and Gas Company, Tulsa, Okla., a corporation of Delaware No Drawing. Application May 10, 1954,
Serial No. 428,823

9 Claims. (Cl. 166—42)

This invention relates to treating oil-bearing or gas-producing formations penetrated by wells. More particularly, it relates to removing water from such formations in the zone extending the first few feet from a well which penetrates the formation.

For the sake of simplicity the terms "oil-producing," "oil-bearing" and the like will be used broadly hereinafter to indicate formations or zones which produce either oil or gas or both unless specifically stated otherwise.

When water is present in an oil-producing zone, the water can block flow of oil to a well through at least part of the formation. This action is generally referred to as water blocking. Water blocking is particularly serious in formations in which the solid surfaces are wet principally by oil. One method of removing a water block is to inject an oil solution of an agent capable of reducing the interfacial tension between oil and water. Such a method is described in 2,465,237 Larsen, for example. Variations of this method have been placed in commercial use recently with considerable success. Three principal problems remain to be solved, however. One of these is the failure of present treatments to remove water blocks from some formations where such blocking is known to exist. The second problem is more serious and consists of a tendency of the present treatments to produce a positive plugging action in some formations. Such plugging results in a decrease in the abilities of the treated formations to produce oil or gas. Even in those cases in which present treatments cause some increase in producing rates of wells, further increases would, of course, be desirable. The third problem relates to the rate of water removal. Frequently, the flow of oil will cause at least some of the blocking water to move out of a formation. This is particularly true of water-wet formations. The rate of water removal may be very slow, however, particularly if the production rate is limited by proration laws. If the water could be removed more quickly, the potential production would be increased and a higher allowable production rate might be obtained.

With the above problems in mind it is an object of this invention to provide an improved method for raising the productivity of oil-bearing formations. A more specific object is to provide a method for increasing the producing abilities of oil and gas wells in which presently available methods are relatively ineffective. A principal object of my invention is to provide a method for removing water blocks from formations, this method causing little plugging action in formations in which presently available methods decrease the capacities of wells to produce oil and gas. An additional object is to increase the rate of water removal from water-blocked formations.

In general, I accomplish the objects of my invention by injecting into an oil-bearing zone of a formation a solution of an oil-soluble surface-active agent in a carrier liquid. The additive must be capable of reducing the interfacial tension between oil and brine in the formation to less than about 2 dynes per centimeter. The reduction must be obtained by using concentrations of the additive of less than about ½ percent by weight in most cases. A minimum concentration of about 1/10 percent by weight should also be observed.

I have found that the difficulties in the prior art methods are due primarily to three factors. First, there has been a failure to recognize the importance of zones having low permeabilities. Second, critical limits exist with respect to concentrations of additives if they are to be effective but still avoid a plugging action. Third, very few additives available in the past have been able to produce extremely low interfacial tensions between oil and brines in the formations. Therefore, the unexpected results which can be obtained by producing such low interfacial tensions have not previously been observed. These three factors will be considered separately in more detail. It should be considered that "water" as used in this specification usually refers to oil field waters, that is, brine.

IMPORTANCE OF LOW-PERMEABILITY ZONES

It is well known that the permeability of formations varies widely over short distances, both horizontally and vertically, so that zones of naturally low permeability exist throughout the formation. These zones are somewhat troublesome, but the principal problem seems to be the artificially plugged zones surrounding well bores. Such zones apparently exist around a surprisingly large number of wells. Thus, for example, my process has been found to be effective in wells along the Gulf of Mexico, where oil bearing formations were thought to be much too permeable to permit establishment of an effective water block. Further investigation has shown that many of these formations apparently contain fine particles of sand, shale, and clay which are free to flow toward the well with the produced fluids. First, the larger particles apparently bridge across the large openings to form smaller openings. These smaller pores are, in turn, bridged by smaller particles to reduce the pore sizes and hence the permeability to a degree which permits water blocking to become serious. Even in areas where loose sand or other particles are not present, some authorities believe that finely divided solids from drilling fluids may penetrate the zone around a well and produce a similar bridging action with consequent permeability reduction. The more finely divided particles in cement slurries may also penetrate formations and reduce the permeabilities. Organic solids such as asphalt and paraffin and inorganic solids such as sodium chloride and calcium carbonate may also become deposited in a zone near the well. In many cases such precipitates may very greatly reduce the permeability of this zone. Even though analyses of cores taken at the time a well is drilled indicate high permeabilities, there is no assurance that such permeabilities actually exist in the zone of the formation surrounding a well after even a short period of producing oil from the well.

The zones of low permeability around wells are important for two reasons. In the first place they become seriously water blocked much more easily and permanently than those of higher permeabilities. Second, there is a greater tendency for treating agents to cause plugging of the less permeable zones. With regard to the tendency to become seriously water blocked and the permanency of the block, it has been found that zones having permeabilities in the range of 500 to 1000 millidarcies or more rarely have pores sufficiently small to be blocked badly by water. Zones having permeabilities in the range of about 100 to 500 millidarcies in general can be water blocked to a serious degree, but most of the block can be easily removed by use of most interfacial tension reducing agents now commercially available. Zones having permeabilities below about 100 millidarcies usually become water blocked so tightly that most presently used agents are unable to break the block. This is particularly true for zones with permeabilities in the range, for example, of about 5 to 10 millidarcies. Apparently such permeabilities are not at all uncommon in the zones immediately surrounding wells. This accounts for the failures of some prior art processes in cases where the permeability was thought to be reasonably high and where the well was known to be water blocked. For example, the well may have lost productivity after being shut-in with water opposite the oil-producing horizon, or after a workover job with water as the drilling fluid. By observing the limitations of my method, the productivity of such wells can be greatly increased.

The plugging action of oil-squeeze additives apparently is due to emulsification of the oil and water in tight zones. Most surface active agents used as oil-squeeze additives have at least some tendency to emulsify oil and water. This is particularly true when the oil and water are squeezed through the small constrictions in tight zones of a formation. The action is probably similar to that in an orifice-type emulsifier. Thus, when oil containing additives is squeezed through the tight zone surrounding a well, whether the formation is oil-wet or water-wet, a rigid emulsion can be formed which effectively plugs the zone, preventing flow of oil to the well from the more permeable portion of the formation a few feet from the well. It is also possible that plugging may be due in some cases to the detergent action of the additive on fine silt, clay or sand particles attached to the sand grains of the formation. If, by detergent action, the additive displaces these finely divided solids from the surfaces to which they are attached, the plugging action is then the same as that which occurs when loose silt is naturally present in the formation. Any of these actions would explain the plugging which has occurred in some cases when presently used additives are employed in oil squeeze operations.

As in the case of water-blocking tendency, the plugging action depends upon the permeability of the zone treated. Thus, even thick emulsions can be forced through formations having permeabilities in the range of 500 to 1000 millidarcies or above. The rate of flow is small, but flow occurs. It is not possible to plug such highly permeable zones since the plug flows out of the zone as quickly as it is formed. In zones having permeabilities in the range of about 100 to 500 millidarcies plugging is sometimes possible, but generally the concentration of most oil squeeze additives must be quite high, for example 3 to 5 percent, to cause the plug. Apparently only higher additive concentrations can cause the formation of tight emulsions when oil and water flow through the relatively large constrictions in zones having permeabilities in this intermediate range. If plugging is due to displacement of silt from sand surfaces, apparently only high concentrations of additives can cause sufficiently rapid displacement to cause formation of a plug. If plugging materials are released more slowly, they seem to flow on out of these zones of intermediate permeability. If a zone surrounding a well has a permeability in the range below about 100 millidarcies, plugging can occur quite easily. This is particularly true if the permeability is in the range of about 5 to 10 millidarcies.

Here again, the importance of the unexpected prevalence of zones of low permeability surrounding wells becomes apparent. All oil entering the well must flow through this zone which is the most easily and permanently water blocked and which tends most to become plugged due to the action of oil squeeze additives. It has not been found possible to predict when such a low-permeability zone exists, or what the permeability range might be. Therefore, if a treatment is to be effective and is not to cause plugging of this critical zone, the only safe procedure is to employ methods and additives which will be effective in removing water blocks from zones of very low permeability, perhaps as low as 5 millidarcies, without causing plugging of such zones.

UPPER CONCENTRATION LIMIT

The observed plugging action caused by oil squeeze additives is the basis of an upper concentration limit. As mentioned above, plugging depends not only on the permeability of a zone, but also on the concentration of oil squeeze additive employed. The concentration of an additive which will cause plugging in any specific formation depends to some extent, of course, on the nature of the particular additive. In a given formation some additives have a greater plugging tendency than others. In general, it can be said, however, that if an oil such as kerosene, fuel oil or high gravity crude oil is used, which has a limited natural emulsifying tendency, about ½ percent of any additive tested to date can be employed without the occurrence of serious plugging. Some classes of additives can, of course, be employed at somewhat higher concentrations than others. A technique for determining the plugging tendency of any specific material at any given concentration will be described later. Until such a measurement is made, however, oil-bearing formations should not be exposed to oil solutions containing more than about ½ percent of a surface-active additive if freedom from plugging is to be assured.

Another factor which influences the setting of an upper limit on concentration is the variation of interfacial tension with concentration. Most additives produce a minimum interfacial tension between oil and water at some concentration close to about 1 percent by weight. Higher concentrations produce higher interfacial tensions. The effectiveness of a treatment is dependent, at least in part, on the interfacial tension lowering ability of the additive. It will be apparent, therefore, that the concentration producing the minimum interfacial tension should not be exceeded. This is another reason for observing a maximum concentration limitation of about ½ percent. Here again, however, there is considerable variation between different additives. The concentration producing the minimum interfacial tension should be carefully determined if the additive is to be used extensively.

The normal maximum concentration limit of ½ percent by weight applies to oil to which the oil-bearing formation is exposed. Considerable oil is usually present in the bottom of a well to be treated by my water block removing process. The concentration of an additive in oil injected into such a well will be decreased due to dilution by this oil in the bottom of the well. Further dilution will occur due to mixing of the injected oil with that naturally present in the formation. The degree of dilution will, of course, vary from well to well, but in the usual case a dilution of about 50 percent can be expected. Thus, to obtain a ½ percent concentration of additive in the oil to which the oil-bearing formation is exposed, about 1 percent must be included in the oil injected into the well. The normal critical upper concentration limit of additive in oil introduced into a well is 1 percent, since this provides a maximum critical upper limit of about ½ percent in the oil to which the formation is exposed. As a practical matter, the conentration of additive in oil injected into wells is usually maintained below about 1 percent in order to avoid all possibility of seriously plugging the formation.

LOWER CONCENTRATION LIMITATION

The lower limit on concentratoon is controlled by two factors: interfacial tension, and what may be termed a mass effect. Enough additive must be used to decrease the interfacial tension to the range discussed later. It has been found, however, that decreased interfacial tension alone is not sufficient. For example, 0.05 percent of one additive may decrease the interfacial tension between oil and water to a lower value than 0.5 percent of another additive. But the 0.5 percent of the second additive may cause water to move out of a core while the 0.05 percent of the first additive will not. Obviously, a factor independent of interfacial tension is involved. When the concentration of the first additive is increased into the range above about 0.1 percent, however, movement of water will usually begin to occur. An increase in concentration to 0.5 percent will cause rapid removal of water from the core by flow of oil containing the additive. This minimum concentration requirement is so similar to that displayed by detergents, that I suspect the action of the additive may often be one of detaching water from local water-wet portions of the formation. Another possible explanation is that a certain excess of additive at the interface is necessary to permit stretching out of the oil-water interface, when droplets are displaced through constrictions, without excessive dilution of the additive in the interface. Whatever the theory may be, however, it has been found that in general no movement of water occurs in tight zones of some formations unless at least about 0.1 percent by weight of additive is present in the oil phase in contact with the brine. Preferably the concentration of the additive should be about ½ percent. To compensate for dilution effects of oil in the well and formation, the concentration of additive in the oil introduced into the well should be at least about 2/10 percent by weight and preefrably about 1 percent.

INTERFACIAL TENSION LIMIT

Additives, to be suitable in my process, should decrease the interfacial tension between oil and water in the formation to a point below about 2 dynes per centimeter. It has been found experimentally that frequently surprisingly large increases in permeability of tight zones can be obtained by reducing the interfacial tension below this value. It is true that if a zone has a permeability in the range above about 100 millidarcies, then reduction of interfacial tension between water and oil in the zone to about 2 or 3 dynes per centimeter will usually permit a large recovery of permeability quickly. Reduction of interfacial tension to a value as high as 10 dynes per centimeter will even give considerable improvement in many of the more permeable zones as well as some with lower permeabilities. This undoubtedly accounts for the improvement produced by commercially available oil-squeeze additives. If a zone is to be treated having a permeability below about 100 millidarcies, however, the interfacial tension should not exceed about 2 dynes per centimeter. This limit applies particularly to many zones having permeabilities in the range of about 5 to 20 millidarcies. Since such zones have been found to exist frequently around wells, and since it is extremely difficult, or impossible, to determine exactly what the permeability of such a zone might be, I have found it advisable to employ always an additive which is effective for treating such zones. This means that an additive should always be employed which will reduce the interfacial tension between water and oil to below about 2 dynes per centimeter.

The low interfacial tension must be reached by use of additive concentrations within the critical upper and lower limits set out above if the oil squeeze is to remove water blocks from the very tight zones immediately surrounding wells. Failures and difficulties met by a prior art processes can be easily understood considering the many factors not previously recognized. First is the recognition of the existence and importance of the tight zones immediately surrounding wells. Then there is the discovery that a maximum concentration limit must be observed to avoid plugging and a minimum limit to cause movement of water. Finally, there is the discovery that surprising permeability increases can be obtained in the tight zones by decreasing interfacial tensions below about 2 dynes per centimeter, a point several times lower than that obtainable by most perior art additives.

OIL SOLUBILITY

Since the additive is to be used in an oil solution, it must, of course, be oil soluble. However, the solubility need not be great. For most additives a solubility of 1 percent is adequate. When the term oil-soluble is employed hereinafter it is intended to mean a solubility in oil to the extent required to give the desired concentration for treating purposes, normally at least 1 percent by weight.

A question often arises whether a material is oil-soluble or simply oil-dispersible. If an additive is sufficiently oil-dispersible to penetrate an oil-bearing formation with the injected oil, and if it reduces the oil-water interfacial tension sufficiently to cause removal of water from the zone near the well, there is every reason to suppose that an oil-dispersible material should be as effective as one which is truly oil-soluble. If an additive forms an oil dispersion which is stable for several hours and which fulfills the requirements outlined in the following tests, it should be considered oil-soluble for purposes of my process.

TESTS FOR ADDITIVES

In determining whether a particular surface activ agent is suitable for my process, three physical properties should be determined. These properties are interfacial tension reducing ability, plugging tendency and ability to cause movement of water out of a formation. In determining these properties of a material the following tests should be employed.

Interfacial tension between oil and brine can best be measured by a DuNuoy tensiometer, although other means are probably also suitable. The technique is well known and consists of placing the brine in the bottom of the container, cleaning a platinum ring by heating to incandescence, dipping the ring into the brine, floating the filtered oil solution of additive onto the top of the brine, and determining the force necessary to cause the platinum ring to pull through the brine-oil interface. The values obtained in this way depend on several principal factors: First, the nature of the brine; second, the nature of the oil; third, whether equilibrium between the oil and aqueous phases has been reached; and fourth, the temperature. In order to obtain a reliable standard for comparison the following brine, oil, time, temperature, and technique have been adopted. When interfacial tension values are referred to hereinafter they are determined according to these standards unless otherwise specified.

In carrying out the above-described surface tension determinations the brine employed contains 96,000 p. p. m. by weight of sodium chloride, 9,000 p. p. m. calcium chloride, and 3,000 p. p. m. magnesium chloride. The oil is a narrow boiling petroleum fraction containing hydrocarbons predominantly in the range having from 10 to 12 carbon atoms per molecule. The time allowed for equilibrium conditions to be approached is arbitrarily set at about 5 minutes. The temperature of the liquids should be about 70 to 80° F.

The plugging tendency of an additive, and its ability to cause water to move out of a formation at low concentrations, can be determined by a simple apparatus. The equipment consists of a small core mounted so that oil solutions of the additive can be forced through it. The core should preferably be from the zone to be treated, although some other core, selected as a standard, may be used. The core should have a circular cross-section with a diameter of about ¾ inch and a length of about 1 inch. It should be mounted in a tight fitting sleeve such as a rubber stopper, or a rubber tube to which external pressure can be applied to achieve a seal between the sleeve and the core. A pressure differential of about one atmosphere should be applied across the core to force the additive-containing solution through the core.

The procedure is to flow oil through the core to determine its original permeability. The oil should be the standard narrow-boiling petroleum fraction previously described. The brine described for determining interfacial tension is then forced through the core and the permeability to flow of the brine determined. The petroleum fraction is then again introduced and the water-blocked permeability is determined. A solution of the additive in question in the petroleum fraction is then introduced in the concentration range required to produce the necessary reduction of interfacial tension. Several possible results may be obtained. First, if the additive is satisfactory in both water-removing ability and non-plugging tendency at the selected concentration, the permeability of the core will increase after a few pore volumes of the solution have passed through the core. Second, if the oil solution of the additive does not block the core but has little water removing ability, little or no change in permeability will occur. Third, if this solution tends to plug the core the permeability will decrease whether the water removing ability of this solution is satisfactory or not. If the core is not plugged by this solution, but the permeability does not rise, the concentration of the additive should be increased to determine if movement of water can be obtained before plugging occurs. If the core plugs, another test should be made at a lower concentration of additive. Fortunately, most satisfactory additives seem to have approximately the same operable concentration ranges. Thus, all additives tested to date, if satisfactory at all, have been found to be operable in the range of concentration between about $\frac{1}{10}$ and about $\frac{1}{2}$ per cent by weight.

Whether a core is water-blocked or not can probably best be determined during the testing of the plugging tendency. If it is already water-blocked this fact can be determined rather simply by forcing into it one of the materials, specifically named below, which has been found to be a suitable water block remover. After the water block has been removed and the additive flushed out of the core thoroughly by about 10 to 100 or more pore volumes of the petroleum fraction, the testing of any new material can then proceed as above described.

The important questions are whether the interfacial tension is within the specified range, and whether water movement or plugging occurs in the particular formation of interest in the presence of the particular brine and oil in this formation, at bottom-hole temperature, and after selected shut-in time. All these factors vary from well to well and some cannot be determined with accuracy. Therefore, for purposes of certainty as to the meaning of the terms describing an additive to be used in my process, reference should be had to the above-described tests and standards. For example, reference will be made hereinafter to a surface active agent capable of reducing the interfacial tension between water and oil to below about 2 dynes per centimeter when present in a concentration between about $\frac{1}{10}$ and $\frac{1}{2}$ percent by weight of the oil phase. The described characteristics are to be determined by the tests outlined above, using the standards noted, particularly the standard brine and oil.

It will often be difficult to determine whether an additive is sufficiently oil-soluble to meet my requirements. This is particularly true if the additive is a mixture of materials some of which are oil-soluble and some of which are not. Previous experience has indicated that unless the oil-soluble material is very well dispersed in the oil, this insoluble material will filter out of the oil at or near the face of a core or well bore, tending to form a relatively impermeable cake or zone. Therefore, if an additive is to be tested which is not entirely oil-soluble, the solution should be filtered before testing. If the filtered solution is effective for reducing interfacial tension and also in removing water from cores in which a minimum concentration is known to be critical, then it should be considered satisfactory.

SUITABLE ADDITIVES

By use of the above tests the suitability of any particular material in my process can be determined. A few specific examples of suitable additives will now be described.

One of the preferred class of additives is prepared by alcoholysis of cotton seed oil with oxyethylated sorbitol. The oxyethylated sorbitol should contain from about 1 to about 10 and preferably about 6 moles of ethylene oxide per mole of sorbitol. The alcoholysis should be carried out by mixing the oxyethylated sorbitol and cotton seed oil in the presence of a small amount of an alkaline material such as sodium hydroxide or an acidic material such as sulfuric acid as a catalyst. The ratio of moles of the cotton seed oil to moles of sorbitol should be between about 1 to 1 and about 10 to 1 and preferably about 2 to 1. The concentration of catalyst should be in the range of about 0.01 to about 1.0 percent by weight and preferably about 0.2 percent. The temperature of the alcoholysis reaction should be in the range between about 100 and 200° C. and preferably about 180° C. to increase the speed of the reaction. When reference is made hereinafter to the alcoholysis product of cotton seed oil and oxyethylated sorbitol, a product prepared substantially in the manner just described is intended.

Suitable esters formed by reaction of oxyethylated sorbitol and fatty acids can also be prepared by direct esterification of the alcohol and acids. Such esters, suitable for my process, should contain from about 2 to 5 moles of acid per mole of sorbitol. The fatty acids should contain at least 12 carbon atoms per molecule and preferably should be predominantly in the 16 to 18 carbon range. These may be derived from sources such as cotton seed oil, tall oil, coconut oil, soy bean oil, sperm oil, tallow, lard and other vegetable and animal fats and oils. Acids derived by oxidation of petroleum may also be employed.

Ethylene oxide can sometimes be added to the sorbitol after the esterification or alcoholysis, but the term oxyethylated sorbitol when employed herein means sorbitol to which the specified amount of ethylene oxide has been added before reaction with the fatty acids.

A highly desirable additive for my process is the alcoholysis product of cotton seed oil and oxyethylated sorbitol containing about 2 moles of cotton seed oil and about 6 moles of ethylene oxide per mole of sorbitol. Such a material is obtainable from the Atlas Powder Company under the trademark Atpet 931. Another highly desirable additive, also obtainable from the Atlas Powder Company, is sold under the trademark G–2854 and may generally be described as the ester of oxyethylated sorbitol and oleic acid containing about 4 moles of oleic acid and 6 moles of ethylene oxide per mole of sorbitol. As explained later, both products are actually mixtures of many species of esters. Obviously, both of the above named materials fall within the class of compounds which may be defined as mixtures of esters of oxyethylated sorbitol containing about 6 moles of ethylene oxide and about 2 to 4 moles of fatty acids per mole of sorbitol, the fatty acids having predominantly 16 to 18 carbon atoms per molecule. Another specific material of a different class which has been found to be very desirable for most purposes is obtainable from Armour and Company as Duomeen-T. This material has the formula $RNH(CH_2)_3NH_2$ wherein R is a hydrocarbon radical, preferably aliphatic, containing from about 16 to 18 carbon atoms.

Classes and examples of materials other than those just described may, of course, be found to possess the required physical properties by means of tests which have been described. Therefore, the classes and specific materials mentioned above are presented principally by way of example only. As explained later, however, the above-described preferred classes of materials are quite superior in some respects to most other additives tested.

MIXTURES OF ADDITIVES

The preferred additives just described may be employed alone or in combination with each other or with other materials. In this connection it is of interest to note that the sorbitol derivatives are undoubtedly themselves mixtures of compounds. When one mole of sorbitol is oxyethylated with six moles of ethylene oxide there are hundreds of combinations in which polyoxyethylene chains of various lengths can become attached through ether linkages to the sorbitol molecule. In addition, some water is generally present and this water reacts with ethylene oxide to produce ethylene glycol. Polyethylene glycol molecules also undoubtedly exist unattached to sorbitol molecules. When this mixture is esterified with fatty acids, the acids may become attached through one or more hydroxyl groups to any of the various types of hydroxy compounds present. If alcoholysis of a natural fat or oil is employed to form esters of the alcohols, the glycerine in the fat or oil is present as an additional hydroxy compound, any number of the hydroxyl groups being esterified.

I suspect that the superior interfacial tension reducing ability of the sorbitol derivatives is due in large part to the large number of molecules of various types. It is probably because of this complexity that mixtures of these materials with other surface active compounds are often equally as satisfactory as the original mixtures alone so at least about 20 per cent of the oxyethylated sorbitol ester is present in the mixture. This has been found to be true of mixtures with cationic materials such as dodecyl amine, anionic materials such as sulfonated castor oil, or even excess fatty acid, or other nonionic materials such as fatty acid esters of polyethylene glycols, for example, the ester of stearic acid with a polyethylene glycol containing about 10 ethylene oxide groups. Particularly desirable mixtures can be formed with other sorbitol derivatives, such as ethers and esters.

An advantage of the ionic materials when combined with the oxyethylated sorbitol esters, is that in appropriate cases the ionic agents can act as demulsifiers. For example, if the crude oil contains natural emulsifiers which cause emulsions known to be broken by one of the types of ionic surface-active agents, this type of demulsifier may be added with considerable advantage, or it may already be present due to previous addition to break emulsions. The oil-soluble surface-active agents themselves have some ability to break emulsions of the oil-in-water type. At least part of the permeability improvement caused by these materials is, in many cases, probably due to breaking such emulsions in the formation. The combinations with other nonionics appear to be effective even with normally water-soluble materials so long as these materials are present in a minor amount of not more than about 30 or 40 percent by weight of the mixture of surface active agents.

Even a combination of water with the alcoholysis products of cottonseed oil and oxyethylated sorbitol has been found to give somewhat lower interfacial tensions between water and oil than the water-free form if low concentrations are employed. Apparently the water becomes associated with the hydrophilic portions of the molecule, greatly facilitating the entry of this portion into the water phase from the oil solution.

Duomeen-T is a relatively simple mixture, compared to the sorbitol derivatives, in that the various molecules differ only in the type of hydrocarbon radical attached to the diamine nucleus. Duomeen-T is prepared from tallow acids so the hydrocarbon portions of the molecules are mostly saturated radicals containing 16 or 18 carbon atoms. Duomeen-S, which is equally suitable for my purposes, is prepared from soy bean oil so the hydrocarbon radicals are predominantly unsaturated, but still contain mostly 16 or 18 carbon atoms. Duomeen-C, on the other hand, is prepared from coconut oil acids so the hydrocarbon radicals vary considerably in chain length down at least to the minimum effective length of about 12 carbon atoms. This material is also satisfactory for my purposes. In general the Duomeens can be represented by the formula $R'NHR''NH_2$ wherein $R'$ is a hydrocarbon radical, preferably aliphatic, containing at least about 12, and preferably not more than about 20, carbon atoms, and $R''$ is an aliphatic hydrocarbon radical containing from 2 to 4 carbon atoms.

Combinations of the Duomeens with other cation-active materials such as dodecyl amine are satisfactory. Also suitable are combinations with anionics such as fatty acids, for example oleic acid or sulfonic acids such as petroleum sludge acids or sulfonated castor oil.

Particularly desirable combinations of the Duomeens can be prepared with the oil-soluble nonionic surface active agents such as the esters, ethers and amides; for example, the oxyethylated sorbitol derivatives. These are outstanding among the combinations of the Duomeens with nonionics since the interfacial tension produced by a given concentration of the mixtures is generally considerably lower than that produced by the same concentration of either constituent alone. Mixtures of the Duomeens with oxyethylated sorbitol esters are preferred because of the lower interfacial tension which is produced between oil and water. The minor member of such a mixture should be present in an amount of at least about 5 percent to produce the combination effect.

There is some evidence that a combination action can be obtained by use of different types of additives in succession. For example, an anionic additive such as sulfonated castor oil in a suitable solvent may be injected into a formation ahead of a solution containing a nonionic additive such as Atpet 931. Such a treatment seems to cause a more rapid recovery of permeability than when either additive alone or a mixture in a single solution is employed.

The surface active additives can also be mixed with other types of materials. For example, low concentrations, around 0.05 percent, of Duomeen-T are somewhat sensitive to pH with regard to interfacial tension reducing ability. The interfacial tension is lower between oil and a low pH water than between the same oil and high pH water. Therefore, it may be desirable to add to the oil, containing Duomeen-T, acidic materials such as acetic acid, or the chlorinated lower molecular weight organic acids such as trichloro propionic acid. Acid-generating materials such as benzotrichloride may also be added. These same materials may also be employed with advantage with the oxyethylated sorbitol esters. In this case, however, the purpose is to adjust the salinity of the water phase by reaction of the acidic material with formations which are contacted. Increase in salinity of the water is sometimes desirable since the interfacial tension between oil and fresh water in the presence of oxyethylated sorbitol esters is higher than the interfacial tension between oil and brine. Preferably, the salinity should be adjusted by a two-step process including a brine-injection step as more fully described later.

Another type of material which can be added to the oil-squeeze solution is a bridging agent such as ground hard nut shells. Finely divided solids such as sodium chloride, clay, limestone or the like may also be added. The purpose is to equalize the flow of the treating oil into all zones of varying permeability in the formation. The bridging agent bridges fractures and the finely divided solids form a filter cake which is thicker over more permeable zones and hence offers more resistance to flow than the thinner cakes over less permeable zones.

Mixtures with other materials such as pyridine or other paraffin solvents will also be apparent to those skilled in the art.

SOLVENTS

Reference has been made to my method as an oil squeeze process although a better name would be a water-block removing process. The solvent employed in the described tests is a hydrocarbon oil. The solvent most commonly used in field tests of the invention has been ordinary crude oil. Other solvents may also be used, however, sometimes with considerable advantage. For example, if the lease crude oil has a strong emulsifying tendency with water it will be preferable in most cases to bring in another crude oil or possibly a refined petroleum fraction such as kerosene, diesel oil, or the like. Other oils such as whale oil, cotton seed oil, or other animal or vegetable oils may also be employed if desired.

Although the cost of such materials is generally comparatively high, solvents for water such as the lower alcohols or ketones, for example, methanol or acetone, can be used as carrier liquids for the proposed additives with considerable advantage. Efforts have been made in the past to employ alcohols and ketones without additives to remove water from oil bearing zones of formations penetrated by wells. It has been found, however, that the solution of water in these solvents generally have a fairly high interfacial tension against oil. Therefore, the oil has been found to have about as much difficulty moving these solvents out of treated zones as it had in removing the original water. If an additive such as Atpet 931 is included in the alcohol in a concentration of about 1 percent, for example, the carrier liquid will dissolve water just as it did in the old process. The presence of the additive now permits oil flowing through the zone to remove the carrier liquid and the dissolved water much more effectively from the treated zone. Once considerable permeability has been established in the zone, the flow of oil through this zone then removes most of the remaining carrier liquid since this class of materials is slightly soluble in oil. Thus, only a very small fraction of the original contaminating water remains in the treated zone. Other solvents for water, such as pyridine, can also be employed as carrier liquids for the additives if desired.

It is also often advantageous to employ carrier liquids such as carbon tetrachloride, benzene or the like, known to have high solvent powers for paraffin and asphaltic materials which may have been deposited in the zone near a well. In this way the permeability of the zone can be increased not only by removing the water which is blocking flow of oil to the well but also by removing some of the cause of the low permeability of the zone which permits such an effective water block. Other carrier liquids and their advantages will, of course, be apparent to those skilled in the art.

Non-volatile oil can be used as a solvent in clearing water blocks from most gas zones but a special problem requiring a particular type of solvent arises in some gas fields. It has been found that formations producing gas in some areas are plugged almost as much by oil as by water. A treatment of such a zone by an oil solution of additive to remove water may, therefore, do more damage than good. In such cases, it has been found advantageous to employ as the solvent for the additive a light hydrocarbon such as propane or butane. Such a solvent acts not only to displace contaminating water in the treated zone, due to the decreased interfacial tension between the solvent and water, but acts also as a solvent for any heavier hydrocarbons which may be decreasing the permeability of the zone near the well. Most of the light hydrocarbons will move out of the gas zone carrying water and heavier hydrocarbons with it. Any solvent remaining in the formation will then evaporate into the produced gas due to its high volatility. It is true that some of the additive and dissolved hydrocarbons will remain behind in the formation but this is often advantageous in that these materials tend to hold finely divided solids preventing their movement into the zone immediately surrounding a well to cause a lower permeability of this zone.

The naturally viscous or artifically thickened oils employed for fracturing operations can be employed as solvents, the oil then serving not only to fracture the formation, but also to remove water from zones not fractured and from the formation along the fracture. In this way the productivity of zones not affected by the fracture will be increased. In addition, any water block in the formation exposed to the fracture will be removed, permitting more efficient function of the fracture in conducting oil from the formation.

Mixtures of solvents will sometimes be advantageous. For example, a mixture of a paraffin solvent such as carbon tetrachloride and oil in approximately equal amounts will have a strong dissolving action on the paraffin but will be much less expensive than the carbon tetrachloride alone. A particularly advantageous mixture of solvents is petroleum oil mixed with a mutual solvent for oil and water such as isopropyl alcohol. The alcohol should be used in an amount between about 5 and 50 percent by volume. Preferably about 10 percent of the mutual solvent should be present. When such a solution is forced into a formation the mutual solvent tends to dissolve to some extent in the water present in the formation. This is particularly true of the lighter alcohols such as ethanol or the propanols. The result is what may be termed a bulking effect in which the volume of the water phase may be increased many fold. It will be noted that the water will not tend to flow back into the formation ahead of the alcohol-oil mixture to the same extent as when pure alcohol is injected. The oil will tend to flow past the water, a part of the alcohol remaining behind in the water phase. Thus, when the well is again produced, the oil containing the interfacial tension reducing agent, will force the alcohol-water solution out of the formation and into the well, leaving only a trace of the original water present in the treated zone. The alcohol remaining in the zone slowly dissolves in the oil flowing to the well.

SIMPLE REMEDIAL PROCEDURE

If a water block has already occurred in a well, the simplest remedial treatment consists of squeezing a small volume of oil containing a suitable additive into the formation and then returning the well to production. For best results certain mixing, well conditioning and treating techniques should be employed as well as preferred additive concentrations and volumes of treating oil. The well should first be conditioned by removing as much of the water in the well bore as possible to avoid forcing this water into the formation to be treated. If the productivity rate of the well is low, and adequate pump capacity is available, the pump should be lowered as far as possible into the well, or at least to the bottom of the zone to be treated, and the fluid level of the well lowered to the pump level. If the production rate of the well is too high to be pumped off, water should be pumped out while approximately balancing formation pressure by introducing oil into the casing outside the tubing.

When most of the water has been removed as well as most of the oil, if possible, the carrier liquid, usually lease crude oil, containing the additive is introduced into the well. The additive may be mixed into the oil by addition to a tank, and circulating by means of a pump or other appropriate stirring means. The additive may also be introduced, by means of a proportioning pump, for example, into the oil as it flows or is being pumped into the well. The concentration of additive should be between about 1 and about 0.1 percent by weight of the oil. The higher concentration should be used where considerable dilution is expected. The lower concentration, being at or near the lower limit of effectiveness, should be used only in rare cases where no dilution is expected and an unusual tendency to plug has been found to exist. The concentration may be kept constant or may be high at first, when most dilution will occur, and then taper off to a lower value.

The oil solution or dispersion of the additive may be simply poured or pumped into the annulus between the casing and tubing, or it may be injected through the tubing. Use of the tubing is particularly advisable if a high fluid level of oil exists in the annular space, or if a thin section of exposed formation is to be isolated by packers, gels, or the like and then treated with the water block removing process.

Volumes of treating solutions tested to date in wells have varied from as low as 500 gallons to as high as 20,000 gallons. Lower or higher amounts may be advisable in some cases. In general, the amount of treating solution in field tests has averaged around 40 gallons per foot of exposed formation. The volume may be as much as about 500 gallons per foot of exposed formation thickness. The latter volume will normally clear the water block from a zone extending out about 10 feet or so from the well. It is believed that serious water blocking rarely extends much beyond this distance. Larger volume treatments are particularly important where gas comes out of solution near a well to produce a gas block. Since most of the pressure drop then occurs across the gas block, little pressure drop exists a few feet from the well to cause flow of oil past water blocks.

The rate of injection to be employed depends on the purpose of the treatment. If it is desired to remove the water from the producing formation, the treating solution should be injected at a slow rate, for example, by simply pouring it into the well. The reason for the slow rate is to cause flow of the solution principally through the large pores and not through the water-blocked capillaries. Thus, there is less tendency to force water back away from the well bore. When the treating solution is caused to flow back out of the formation into the well, the rate of flow should be as great as possible to cause flow of solution through as large a proportion of the small capillaries as possible. In this way the water is forced to flow from the capillaries into the well bore from which it can be easily removed to the surface.

If it is desired to remove the water block from the zone immediately surrounding the well by forcing the water back away from the well, a rapid injection rate should be employed to sweep the water out of the small capillaries and force it back into the formation. Preferably the rate should be almost, but not quite, sufficient to fracture the formation, although some benefit is to be derived by causing fracturing to occur.

The treating solution may be followed by a volume of flushing oil. The volume of the oil again depends on the purpose. If it is desired to remove water into the well, there is little point in using a flush. In such a case, a volume equal to that of the treating solution should not normally be exceeded. Otherwise excessive dilution of the additive in the treating solution may occur. If, on the other hand, the water is deliberately forced back away from the well it will normally be advisable to employ a fairly low concentration of additive, such as about 0.2 to 0.5 weight percent. A flush having a volume at least about as great as that of the oil solution, and preferably about 2 to 10 or more times the volume of treating solution is then used to dilute the concentration of additive to below about 0.1 percent. In this way there will be much less tendency for the additive to cause flow of the water back into the zone around the well when the well is again produced.

In some cases, a combination treatment may be employed wherein a first batch of treating solution is injected at a rapid rate and flushed back by a large volume of oil as first described. A second volume can then be injected at a slow rate to cause flow into the well of any residual water remaining in the critical zone near the well.

Other applications of my remedial treatment will be apparent to those skilled in the art. For example, it may be applied to drill stem testing of wells. In this case, the drill pipe, or other string of tubing, is lowered to the zone to be tested. This zone is flushed clear of drilling fluid or other water. The zone is then isolated from the remainder of the well by use of packers, for example. A solution of an additive falling within the limits previously set out is next injected into the isolated zone of the formation. After a suitable length of time the treating solution is caused to flow back out of the treated zone by swabbing, for example. After the treating oil is recovered, the producing rate of the zone can be determined more accurately due to removal of the water block which would otherwise decrease considerably the rate of flow of oil from the zone. If commercial quantities of oil are discovered in the drill stem test, but drilling is to continue, it is advisable to inject an oil solution of my additive into the oil-producing zone to insure future removal of drilling fluid filtrate.

After displacing the solution of additive back into the formation in any of my procedures, remedial or otherwise, it is usually desirable to hold the solution in place for a time which may vary from a few minutes to several days. About 24 hours is generally preferred. The reason for the delay is to permit the interfacial tension reducing additive to diffuse to the oil-water interface and become concentrated there. Diffusion of effective amounts of additive to water droplets isolated in very small capillaries may require several hours. When oil solutions containing low concentrations of additives are placed in direct contact with water in the laboratory, the interfacial tension usually continues to drop over a period of as much as an hour as the additive slowly becomes concentrated at the interface. The situation in the formation obviously is much worse.

This delayed action is advantageous if it is desired to cause flow of water back into the well. When the oil solution is first injected into the formation, little additive reaches the oil-water interface during the short period of injection. Therefore, there is only a limited tendency for the water to be forced back away from the well by the injected oil. During the waiting period, however, the additive becomes concentrated at the interface so when the well is again produced the oil and water tend to flow along together into the well.

The esters of oxyethylated sorbitol are particularly desirable in their ability to become concentrated at the interface. Apparently, when the sorbitol portion of such esters become strongly hydrated, the materials lose much of their oil solubility. When this occurs, there is a tendency of these additives to be held at the surface of any water remaining in the formation to provide an extended period of effectiveness. To provide sufficient time for good hydration of the oxyethylated sorbitol esters, the oil solutions should be held in the formation for several days, for example a week. While additional effectiveness may be obtained by such long waiting times, the oxyethylated sorbitol esters are also highly effective at short waiting times, or even with no time at all between injection of the oil solution and production of the well.

SIMPLE PREVENTIVE PROCEDURE

The description to this point has been directed principally to my invention applied as a remedial method. It can be applied to greater advantage, in many cases, as a preventive step. That is, if for any reason it is anticipated that water is to enter a formation from a well, it will be advantageous to inject the treating solution into the formation before water-contamination occurs. Then, when the well is put back on production, the treating solution forces the water out of the formation and into the well ahead of it. For example, it may be necessary to shut in a well in accordance with orders of a governmental regulatory body. In such a case water may fill the well to a level far above the oil-producing zone. This water may penetrate and water-block the oil zone to a serious degree. To prevent the occurrence of such a water block it is advisable to force a volume of oil containing a suitable additive back into the oil-bearing zone and fill the well with sufficient oil or water to prevent flow of the treating solution out of the formation until such time as the well is again to be produced.

Another instance of water contamination occurs when a well is deliberately killed for various purposes, by filling it with water or drilling fluid. For example, it may be necessary to pull tubing, repair casing, or work-over or clean out the well. In such a case, the treating solution of oil containing a suitable additive is injected into the oil-bearing zones before the well is filled with water or drilling fluid. Again, any water which pentrates the oil-bearing zone is forced out by the treating solution when the well is produced.

Other similar applications will occur to those skilled in the art. For example, an oil solution of a suitable additive may be injected into the formations penetrated by a well prior to the running of a permeability profile since that process water is forced into the formations by injecting oil on top of it and measuring the rate at which the oil-water interface moves down the well.

COMBINATION PROCEDURES

The step of injecting a treating solution into an oil-bearing zone in accordance with my process may often be employed with other treating steps to produce important combination effects. For example, my treating solution may first be injected and followed into the formation by water deliberately injected. The water may be introduced for several purposes. One reason is to unite all the water droplets into a continuous phase. In this form they are much more effectively removed when my treating solution flows back through the zone containing the water. For this purpose the water may be fresh or salty.

In some cases water-soluble salts become deposited in the critical zone near a well. In such a case the injected water, if not saturated with salt, will dissolve the salt and restore a large amount of the permeability. This will greatly facilitate removal of water block by flow of my treating solution back to the well. At the same time, the ability of the treating solution to remove the water block removes the principal objection to injection of water to dissolve the salt.

A highly saline water may often be injected with advantage, after injection of my treating solution, to increase the salinity of blocking water if it is relatively fresh. The reason for this step is the sensitivity exhibited by some additives, such as the oxyethylated sorbitol esters, to salinity. That is, the interfacial tension between oil and brine is less than between oil and fresh water in the presence of these additives. Thus, the highly saline water not only connects the individual droplets into a single phase but aids the surface-active additive to decrease the interfacial tension between the oil and water in the formation. Materials of the Duomeen-T class do not appear to be sensitive to salinity, and may be preferred in some applications for that reason.

Additives such as Duomeen-T are sensitive to pH in low concentrations of around 0.05 percent of the additive. Therefore, acidified water may be injected after a batch of treating solution containing this type of additive to perform the same function as the salt with the oxyethylated sorbitol esters. Higher concentrations of around 0.5 percent of Duomeen-T do not appear to be pH sensitive and are preferred for that reason.

A highly advantageous treatment consists of injecting my treating solution and following it into the formation with an aqueous acid solution containing from about 5 to 25 percent, and preferably about 15 percent of an acid such as HCl. Such an aqueous solution unites the water droplets into a single phase, dissolves deposits of calcium carbonate, calcium sulfate and the like as well as the water-soluble salts such as sodium chloride, provides a highly saline aqueous phase due to reaction of the acid with the formations, and maintains a desirably low pH in the water phase. The presence of my treating solution removes the fear of water blocking the formation so the method can be applied with confidence to most sands as well as to limestone formations. Since spent acid forms troublesome emulsions with many oils, it may be advisable to add to the acid or oil, or both a demulsifier such as sulfonated castor oil. Other acids such as acetic, chloracetic, hydrofluoric or the like may also be used either alone or in combination in the water.

One precaution should be observed. If a sand is consolidated only by an acid-soluble material, acid treatment will, of course, cause it to become unconsolidated and, as a result, will introduce considerable difficulty. Therefore, it is suggested that the first well to be treated in any formation be given only a small acid treatment, for example 1 to 100 gallons per foot of formation thickness, and the acid concentration should be low, for example about 5 percent.

The water injected after my treating solution may contain an alkaline detergent material such as sodium hydroxide, trisodium phosphate, sodium hexametaphosphate or the like. The purpose is to make the formation more water wet. It is well known that formations which are oil-wet or of mixed wettability are more seriously water blocked than those which are water-wet. Therefore, when the formation is made more water-wet, the flow of oil is inhibited to a much smaller extent by a water block. In making the formation more water-wet, however, the permeability to flow of oil may be considerably reduced simply due to the increased bulk of water present. This may even cause the oil phase in such cases to become discontinuous. When the water-wetting solution is forced out of the formation by my previously injected treating solution, however, a very large proportion of the water is removed. Thus, continuous oil flow channels are opened up and only a thin water film remains on the surfaces to lubricate the flow of oil to the well.

In all the processes just described in which an oil solution of my additives is injected into a formation ahead of water, the additive aids the following water in displacing oil from the capillaries. As a result, a much more effective consolidation of water droplets into a single united phase can occur. Thus, the water aids the oil solution in performing its function and the oil solution in turn aids the water in performing at least some of its functions.

Some wells have been known to exist in which water-producing and oil-producing zones are so intermixed and closely spaced that plugging of the water zones is impractical. Often such wells have started to produce unexpectedly large volumes of water compared to the quantity of oil produced. A possible explanation in such cases is that the water producing zones become oil blocked. Thereupon, the water tends to flow through the normally oil producing zones, thereby greatly reducing the quantity of oil produced. An appropriate treatment for such a well consists of injecting first a solution of oil containing a suitable additive and following this solution with an aqueous solution of a material known to emulsify oil in water and at the same time reduce the interfacial tension between oil and water to a very low value. An example of such an additive is sodium dodecyl benzene sulfonate, obtainable under the trademark Santomerse 3. The aqueous solution then causes removal of the oil block from water-producing zones in much the same manner as my additives cause removal of water block from oil producing zones. That is, upon flow of fluids out of the formation and into the well the aqueous solution removes the oil block from the water-producing zones and the oil solution removes the water block from the oil producing zones. Thereafter water flows through its own zones and does not tend to block flow of oil through the oil-producing zones.

Use of fracturing liquids as suitable carriers for my additives has been mentioned. The use of my additives in fracturing liquids is very advantageous in removing water blocks which may exist in the limited flow area immediately adjacent the fracture. This is particularly true if the fracturing liquid contains much water or is an emulsion. My additive may also be introduced in solutions injected before or after the fracturing liquid. The purpose of injection before the fracturing liquid may be to prevent blocking due to water in the fracturing composition, particularly if this composition is an emulsion. It may also be advisable to introduce my treating solution into water-blocked zones before a fracture is formed since after the fracture is made, treating solutions tend to enter the fracture rather than the unfractured zones. The purpose of injecting the treating solution after the fracturing composition may be to remove any water block which exists adjacent the fracture. This is particularly applicable to fracturing with emulsions such as emulsified acid solutions.

One fracturing technique consists of first injecting my treating solution in a formation to be fractured. An oil dispersion of a water-soluble emulsifying agent, such as the ester of stearic acid with polyethylene glycol containing about 20 oxyethylene groups, is then injected. The concentration of the water-soluble agent should be about 1 or 2 percent to cause an emulsion with water to be produced in the formation. Such an emulsion resists flow, permitting development of pressures sufficient to fracture the formation. If necessary, a little extra water can be injected in the oil suspension of the water-soluble agent to form a good emulsion in the formation. When the well is produced, my treating solution tends to break the emulsion caused by the opposite type of emulsifier, as well as causing the usual removal of water from the fractured zone.

It will be apparent that any of the procedures can be repeated, or that one type of procedure may follow another. For example, an ordinary water block removal process may be employed to eliminate as much water as possible from an entire formation. A fracture may then be formed at a particular level, employing oil containing an additive falling within the class herein stated. It is also possible to repeat a process employing different additives in successive treatments. For example, a first volume of oil may contain Duomeen-T while the second might contain Atpet 931. Some advantage may also be derived by employing as one of the additives a material, such as sulfonated castor oil.

My invention will be better understood by reference to the following examples:

*Example I*

The interfacial tensions of some prospective additives were measured by the methods and equipment, and using the oil and brine described above under the heading Tests for Additives. The results are presented in the following table. All results are in dynes per centimeter. The information is uncorrected for radius and buoyance effects on the ring.

TABLE I.—OIL-BRINE APPARENT INTERFACIAL TENSIONS

| Additive in Oil Phase | Concentrations, Percent by Weight | | | | | |
|---|---|---|---|---|---|---|
| | 0.001 | 0.005 | 0.01 | 0.05 | 0.1 | 1.0 |
| Diglycol Stearate | 31.2 | 33.5 | 32.2 | 22.6 | 24.7 | 8.0 |
| Sulfonated Castor Oil | 41.6 | 34.9 | 33.0 | 22.2 | 18.8 | 1.0 |
| Oleic Acid | 44.6 | 41.7 | 40.4 | 36.0 | 31.3 | 22.7 |
| Cresylic Acid | 32.7 | | | 33.8 | 32.5 | 31.0 | 16.8 |
| Myrj 45 | 27.8 | 19.9 | 17.5 | 7.5 | 3.5 | 0.4 |
| Neutronyx 834 | 28.4 | 20.8 | 17.6 | 5.8 | 1.2 | 0.4 |
| Span 80 | 31.2 | 19.4 | 10.0 | 1.6 | 1.3 | 3.9 |
| Pentamull 126 | 34.8 | 13.6 | 8.3 | 0.7 | 0.6 | 1.0 |
| Tween 65 | 11.4 | 3.8 | 0.7 | 0.3 | [1] 0.3 | [1] 0.3 |
| Dodecyl Amine | 24.4 | | 17.9 | 9.5 | 2.3 | 0.05 |
| 2-Heptadecyl Imidazoline | 1.7 | 0.9 | 0.6 | [1] | [1] | [1] |
| Proprietary Compound I | 31.5 | 31.5 | 26.9 | 7.4 | 0.5 | 2.1 |
| Proprietary Compound II | | | 35.2 | | | 23.7 |
| Avasol 114A | 27.5 | 1.2 | 0.3 | 0.3 | 0.3 | 0.3 |
| Atlas G-2854 | 33.4 | 16.8 | 9.3 | 0.6 | 0.2 | 0.2 |
| Oxyethylated Sorbitol Derivative of Cotton Seed Oil | 30.5 | 18.0 | 0.1 | 0.1 | 0.1 | 0.1 |
| Atpet 931 | 34.8 | 15.1 | 5.6 | 0.3 | 0.1 | 0.05 |
| Hydrated Atpet 931 | 26.1 | 6.9 | 2.7 | 0.2 | 0.1 | 0.05 |
| 75% Atpet 931, 25% Oleic Acid | 39.9 | 19.8 | 7.5 | 0.65 | 0.3 | 0.1 |
| Equal Parts Atpet 931, G-2854, G-891, Tween 65, Span 80, and Myrj 45 | 30.8 | 12.3 | 6.8 | 0.4 | 0.1 | 0.05 |
| Duomeen T | 3.2 | 1.6 | 0.8 | 0.4 | 0.1 | 0.05 |
| Duomeen T Dioleate | 26.9 | 0.3 | 0.1 | 0.1 | 0.1 | 0.1 |
| 25% Duomeen T, 75% Sulphonated Castor Oil | 25.2 | 12.8 | 6.9 | 0.4 | 0.1 | 0.05 |
| 10% Duomeen T, 90% Cresylic Acid | 36.8 | | 9.7 | 0.9 | 0.1 | 0.05 |
| 10% Duomeen T, 90% Neutronyx 834 | 25.0 | 16.1 | 0.7 | 0.2 | 0.1 | 0.05 |
| 10% Duomeen T, 90% Atlas G-2854 | 15.4 | 0.3 | 0.1 | 0.05 | 0.05 | 0.05 |
| 10% Duomeen T, 90% Atlas Span 80 | 30.1 | 7.0 | 0.5 | 0.05 | 0.05 | 0.05 |

[1] Not soluble to extent indicated.

In the table several materials are identified by trademarks. Chemical compositions of these are as follows: Myrj 45 is a polyoxyethylene stearate containing sufficient ethylene oxide to make it water soluble. Neutronyx 834 is also a fatty acid ester of a polyether alcohol. Span 80 is anhydrosorbitol monostearate. Pentamull 126 is the mono ester of oleic acid and pentaerythritol. Tween 65 is anhydrosorbitol tristearate which has been reacted with sufficient ethylene oxide to make it water soluble. Proprietary Compound I is at least in part an imidazoline derivative containing a long hydrocarbon chain. The compound also contains some sulfonates and apparently other minor ingredients. Proprietary Compound II is said to be an aromatic sulfonate. It is water soluble. Avasol 114A is the amide produced from monoethanol amine and a fatty acid. The oxyethylated sorbitol derivative of cottonseed oil contained 6 moles of ethylene oxide and 2 moles of cottonseed oil per mole of sorbitol, the oxyethylation of the sorbitol being carried out before the alcoholysis of the cottonseed oil. Atlas G-891 is the anhydrosorbitol ester of mixed fatty and resin acids. All other materials in the table are described by their chemical names, or are elsewhere defined in this specification.

The most significant data is the interfacial tension at 0.1 percent concentration. It will be noted that common surface active agents such as diglycol stearate or sulfonated castor oil fall short of the required interfacial tension by a factor of at least about 10. Even at 1 percent concentrations the interfacial tension of diglycol stearate is still too high by a large factor. Since higher concentrations of some of these additives further decrease interfacial tension, there is a strong temptation to use higher concentrations. Such practice, however, results in plugging of the tight zones around oil wells. The superiority of the oxyethylated sorbitol esters such as Atlas G-2854 or Atpet 931 and the Duomeen-T is apparent from an interfacial tension standpoint. Note particularly the extremely low interfacial tensions produced by combinations of Duomeen-T and the nonionics. In this connection it should also be noted that the limit of experimental error is about 0.05 dynes per centimeter, so some of the reported lower interfacial tensions are actually below this value. It will be observed that interfacial tensions below 2 dynes per centimeter are produced by several of the combinations in concentrations of less than 0.1 percent. Other examples will demonstrate that in spite of these low interfacial tensions, oil containing the additives was unable to displace water from a core at concentrations less than about 0.1 percent.

*Example II*

The effects of pH on the abilities of additives to reduce the interfacial tension between oil and water were determined as follows: Various concentrations of additives were dissolved in the standard narrow petroleum fraction previously described. The interfacial tensions between these solutions and brines of various concentrations and pH levels were then measured by use of a DuNuoy tensiometer. The results are presented in Table II. The brine in every case reported was the standard one previously described. This brine was simply diluted to obtain the lower salt concentrations, leaving the ratio of the various salts the same. Tests with other brines showed little variations in results. Hydrochloric acid was added to the brine to adjust the pH which was then measured by means of a glass electrode and a Beckmann pH meter. All percentage figures are by weight.

TABLE II

| 0.05% Duomeen-T, 1% Brine | | 0.5% Duomeen-T, 1% Brine | | 0.5% Duomeen-T, 10.8% Brine | | 0.5% Atpet 931, 10.8% Brine | |
|---|---|---|---|---|---|---|---|
| pH | IFT | pH | IFT | pH | IFT | pH | IFT |
| 7.55 | 0.05 | 1.8 | 0.3 | 3.5 | 0.05 | 3.5 | 0.05 |
| 8.1 | .15 | 8.0 | 0.05 | 6.4 | 0.05 | 6.4 | 0.15 |
| 8.5 | .55 | 9.0 | 0.05 | 9.0 | 0.15 | 9.0 | 0.6 |
| 9.0 | 2.2 | | | 10.0 | 0.15 | 10.0 | 0.6 |

IFT = Interfacial tension, dynes/cm.

It will be noted that the interfacial tension reducing ability of low concentrations of Duomeen-T is sensitive to pH changes in the presence of dilute brines. At higher concentrations of Duomeen-T, however, the interfacial tension remains extremely low over a wide range of pH whether the brine is dilute or concentrated. The relatively small sensitivity of Atpet 931 to pH changes in strong brines is to be noted from the last column of the table.

*Example III*

The effects of salinity on the ability of additives to reduce the interfacial tension between oil and water were determined as follows: Various additives were dissolved in the standard narrow petroleum fraction, previously described. The interfacial tensions between these solutions and brines of various concentrations were then measured by use of a DuNuoy tensiometer. Results are presented in Table III. The concentration of additive in the petroleum fraction was 0.5 percent by weight in every case. The brine in every case reported was the standard one previously described, diluted to the desired concentration. Interfacial tension figures are expressed in dynes per centimeter. Brine concentrations are in percent by weight.

TABLE III

| 0.5% Duomeen T | | 0.5% Atpet 931 | | 0.5% Mixture [1] | | 0.5% Amine Complex [2] | |
|---|---|---|---|---|---|---|---|
| Percent Salt | IFT | Percent Salt | IFT | Percent Salt | IFT | Percent Salt | IFT |
| 0 | .1 | 0 | 2.1 | 0 | 0.9 | 0 | 0.2 |
| 0.05 | .05 | .05 | 1.85 | .05 | 0.9 | 0.95 | 0.2 |
| 0.1 | .05 | 1.0 | 1.15 | 1.0 | 0.75 | 0.1 | 0.15 |
| 1.0 | .05 | 2.5 | .45 | 2.0 | 0.3 | 1.0 | 0.15 |
| 10.8 | .05 | 5.0 | .25 | 5.0 | 0.3 | 10.8 | 0.2 |
| | | 7.5 | .15 | 7.5 | 0.3 | | |
| | | 10.8 | .05 | 10.8 | 0.05 | | |

[1] Mixture consisting of 10% Duomeen-T and 90% Atpet 931.
[2] The amine complex was the neutral reaction product of Duomeen-T and Alox 425, the latter being an acid mixture produced by the liquid phase partial oxidation of a normally liquid petroleum fraction.

The Atpet 931 is obviously a very desirable additive if the formation contains a highly saline brine, but will be much less effective in fresh-water formations. The Duomeen-T is almost entirely uninfluenced by salinity effects. Even 10 percent of Duomeen-T mixed with Atpet 931 greatly improved the interfacial tension reducing ability of the Atpet 931 in the presence of low salinity brines. The amine complex is specifically claimed as a composition of matter in copending application United States S. N. 383,689 Jones. The applicability of that complex to oil squeeze operations is also specifically claimed in the earlier-filed application. The complex seems to fall within the limits of my invention and is intended to be covered by my broad claims if used within my concentration limitations.

*Example IV*

To determine the plugging tendencies and the water-removing abilities of various additives, a core about 1 inch long and ¾ inch in diameter was mounted in a rubber stopper which was, in turn, mounted in a Lucite sleeve. The Lucite sleeve had connections permitting forcing a liquid through the core under a pressure differential of about one atmosphere. The core was from the Springer sand and was obtained from a well in the Velma Field of Oklahoma. The large core from the well was drilled with oil-base drilling fluid and was shipped and stored in oil until used. The small test core was drilled from the large core using kerosene as a drilling fluid. The test core, after mounting, was first flushed with the narrow-boiling petroleum fraction previously described, and the permeability of the core to flow of this liquid was determined to be 12.5 millidarcies. The standard brine previously described was then forced through the core and the permeability to flow of this liquid was determined to be 10.4 millidarcies. When the narrow petroleum fraction was again introduced into the core, the permeability was found to be 2.29 millidarcies.

The core was then flushed with the narrow petroleum fraction containing an additive in various concentrations. Generally, about 10 pore volumes of solution at each concentration were forced through the core before changing to the next higher concentration. After an additive was tested at various concentrations, the core was flushed with the narrow petroleum fraction until the additive was substantially completely removed, as indicated by a return of the interfacial tension betwen brine and the effluent liquid to approximately that of brine against the pure hydrocarbon liquid. The permeability of the additive-free core to flow of the narrow petroleum fractions was then measured. The process of water blocking the core and testing the next additive was then begun. The additives are presented in Table IV from left to right in the order tested. Results of the tests together with interfacial tension values for the various concentrations of the several additives are also presented in Table IV. In this table all permeabilities reported, with the exception of those noted below, were determined after flushing the core with about 10 volumes of the narrow hydrocarbon fraction containing the indicated concentration of additive. Exceptions are the top and bottom values in each column of permeabilities which were measured after sufficient volume of pure petroleum fraction had been forced through the core to establish a reasonably constant flow rate. Quantities of liquid employed in such cases sometimes were as high as 100 pore volumes. In the table the term $K_o$ indicates permeability to flow of oil in millidarcies.

It will be apparent from the data in Table IV that by reducing the interfacial tension below about 2 dynes per centimeter, an additive can cause movement of water out of a core, and consequently increase the permeability of the core, if the concentration is above about 0.1 percent. It will be noted that if either the concentration or interfacial tension requirement is not met, little water move-

TABLE IV

| Agent | Atlas G-2854 | | | Atpet 931 | | | 10% Duomeen T, 90% G-2854 | | |
|---|---|---|---|---|---|---|---|---|---|
| | IFT, dynes/cm. | $K_o$, md. | Percent Change, $K_o$ | IFT, dynes/cm. | $K_o$, md. | Percent Change, $K_o$ | IFT, dynes/cm. | $K_o$, md. | Percent Change, $K_o$ |
| Concentration in Solvent: | | | | | | | | | |
| 0.0 | 39.0 | 2.29 | 0 | 39.0 | 1.7 | 0 | 39.0 | 1.35 | 0 |
| 0.001% | 33.4 | | | 34.8 | 1.98 | +16.5 | 15.4 | 1.35 | 0 |
| 0.01% | 9.3 | 2.57 | +12 | 5.6 | 1.96 | +15.3 | 0.1 | 1.37 | +1.5 |
| 0.05% | 0.6 | 2.61 | +14 | 0.3 | 2.1 | +23.5 | 0.05 | 1.37 | +1.5 |
| 0.1% | 0.2 | 3.13 | +36.7 | 0.1 | 2.64 | +55.3 | 0.05 | 2.29 | +69.6 |
| 0.5% | 0.2 | 4.64 | +102 | | 4.76 | +180 | | 4.23 | +213 |
| 1.0% | 0.2 | 5.12 | +124 | 0.05 | 4.70 | +176 | 0.05 | | |
| 0.0% Agent in Solvent Flush after treatment [1] | | | | 5.6 | | +229 | | 5.4 | +309 |

| Agent | Diglycol Stearate | | | Oxyethylated Sorbitol Cottonseed Oil Ester | | | Duomeen T | | |
|---|---|---|---|---|---|---|---|---|---|
| | IFT, dynes/cm. | $K_o$, md. | Percent Change, $K_o$ | IFT, dynes/cm. | $K_o$, md. | Percent Change, $K_o$ | IFT, dynes/cm. | $K_o$, md. | Percent Change, $K_o$ |
| Concentration in Solvent: | | | | | | | | | |
| 0.0 | 39.0 | 2.0 | 0 | 39.0 | 1.35 | 0 | 39.0 | 1.59 | 0 |
| 0.001% | 31.2 | 2.16 | +8 | 30.5 | 1.32 | −2.2 | 3.2 | 1.32 | −15.9 |
| 0.01% | 32.2 | 2.41 | +20.5 | 0.1 | | | 0.8 | 1.45 | −9.7 |
| 0.05% | 22.6 | 2.12 | +6 | 0.1 | | | 0.4 | 1.45 | −9.7 |
| 0.1% | 24.7 | 2.64 | +32 | 0.1 | 2.16 | +60 | 0.1 | 1.44 | −10.3 |
| 0.5% | | 1.6 | −20 | | 3.78 | +180 | | 2.87 | +80.5 |
| 1.0% | 8.0 | 1.6 | −20 | 0.1 | 3.27 | +142 | 0.05 | 3.14 | +97.5 |
| 0.0% Agent in Solvent Flush after treatment | | | | 4.3 | | +218 | | 5.4 | +239 |

[1] Permeability to solvent observed after treating agent flushed out of core by continued flow of solvent.

ment occurs, and hence little permeability increase is obtained regardless of how well the other requirement is met.

The reason for the upper concentration limit is more apparent in Table V. In Table IV, however, results with Atpet 931, diglycol stearate, and the oxyethylated sorbitol cotton seed oil ester all show a decreased permeability when the concentration of additive was increased from 0.5 to 1.0 percent. The other two cases in which both 0.5 and 1.0 percent concentrations were tested showed that most of the recoverable permeability is obtained by use of 0.5 percent concentration. Since 1.0 percent of some additives causes a definite decrease in permeability, and 1.0 percent of the others seems to be little better than 0.5 percent, the only safe practice, at least for new additives, is to limit the concentration to 0.5 percent.

A significant figure reported in Table IV is the permeability of the core after the additive has been flushed out and the interfacial tension has returned to its normal value. In every case where data are available, return to the original interfacial tension apparently caused the water remaining in the core to pull back out of flow channels thus producing an increase in permeability of the core to flow of oil. As noted in later examples, this same phenomenon has been observed in several wells.

The same core was used for all tests reported in Table IV in an effort to eliminate the nature of the core as a variable so the various additives could be better compared to each other. Unfortunately, in cores of such limited permeability, the history of the core apparently has some influence on the water-blocked permeability. This value varies from 2.29 to 1.35 in the reported data. In general, the trend was toward lower permeabilities, an exception, possibly of considerable importance, being a sharp increase in water-blocked permeability after treatment with the mixture of Atlas G-2854 and Duomeen-T. The explanation may very well be that the extremely low interfacial tensions produced by this combination caused movement of water out of very small pores from which it could not be removed by the less effective agents. Upon reblocking these small pores may not have been sufficiently penetrated by water to plug them, thus, leaving a higher water-blocked permeability to oil. Presumably the same thing would occur in formations surrounding a well, in which case the mixture should be much more effective in producing long-lasting results than the single additives used above.

One way of evaluating the results is on the basis of the absolute final permeability. An evaluation more comparable to field operations is on the basis of percent increase over the water-blocked permeability. Both bases are presented in Table IV for comparison.

*Example V*

The procedure in this case was the same as in Example IV. The core was also the same, the following tests being made at the completion of those reported in Table IV. The only change was in the brine. In the tests reported in Table V, the brine used in Example IV was diluted to 3500 p. p. m. to determine how much effect this change in salinity would have on the abilities of Atpet 931 and Duomeen-T to remove water from the core.

TABLE V

| Agent | Atpet 931 | | | Duomeen T | | |
|---|---|---|---|---|---|---|
| | IFT, dynes/cm. | $K_o$, md. | Percent Change $K_o$ | IFT, dynes/cm. | $K_o$, md. | Percent Change, $K_o$ |
| Concentration in Solvent: | | | | | | |
| 0.0% | 39.0 | 1.19 | 0 | 39.0 | 1.08 | 0 |
| 0.1% | 1.4 | 1.08 | −9.2 | 0.3 | 1.35 | +25 |
| 0.5% | 1.6 | 1.87 | +57.1 | 0.01 | 2.0 | +85.1 |
| 1.0% | 1.6 | 1.32 | +10.9 | 0.01 | 1.58 | +46.3 |
| 0.0% Agent in Solvent Flush after treatment | | 4.28 | +259 | | 3.28 | +204 |

It will be apparent that the Atpet 931 is not as effective in removing the low-salinity brine as it was in removing the high-salinity brine as reported in Table IV. The decreased effectiveness is probably due to the increase in interfacial tension to about 1.6 dynes per centimeter in the presence of the relatively fresh water. The Duomeen-T was slightly less effective. Both materials still removed considerable water, however, as shown by the return to high permeability when the additives were washed out of the core. Again, the decrease in permeability was noted when the concentration of additive exceeded about 0.5 percent by weight of the oil.

A mixture of 90 percent cresylic acid and 10 percent Duomeen-T was also tested and found to be ineffective even in concentrations above $\frac{1}{10}$ percent by weight. It is apparent, therefore, that the additive must be surface active in the sense that it concentrates at the interface due to water-soluble portion and an oil-soluble portion, the oil-soluble portion containing at least about 12 carbon atoms to prevent excessive solubility in the water phase.

Example VI

To check, in the laboratory, results obtained by use of the Springer sand cores, samples were obtained from a well in the Grass Creek Field, Wyoming. The core from the well was drilled with oil-base drilling fluid from the Curtis sand. The core was shipped and stored in oil until the test cores were drilled from it using kerosene as a drilling fluid. Each additive in this case was tested in a separate test core, about 1 inch long and ¾ inch in diameter, obtained from the single well core. Each core was water blocked with the standard brine perviously described and then treated with various additives at several concentrations. The results are presented in Table VI. The standard narrow-boiling petroleum fraction previously described was employed as a solvent in every case.

TABLE VII

| Additive | | Permeability | | | |
|---|---|---|---|---|---|
| Material | Concentration | IFT | Original | Water Blocked | After Additive | After Atpet 931 |
| Proprietary Compound I | 0.5 | 0.2 | 28.3 | 2.1 | 4.3 | 8.6 |
| Proprietary Compound II | 1.19 | 23.7 | 30.6 | 6.4 | 8.2 | 27.0 |

The abilities of the proprietary compounds to increase the permeabilities of the cores to some degree should be noted. It will be observed also, however, that the Atpet 931 doubled the permeability of one treated core and more than tripled that of the other core. The concentration figures for both proprietary compounds are misleading. In both cases considerable diluent was present in the commercially available products employed. The diluent is added to facilitate handling of the materials as a less viscous liquid in the field and also to reduce costs. The actual concentrations of active ingredients is not known. All evidence indicates that the diluent is present in concentrations considerably over 50 percent.

As previously noted in connection with Table I, Compound I is reported to be a substituted imidazoline and TABLE VI.—RESULTS OF PARALLEL TESTS ON DIFFERENT CURTIS SAND CORES, GRASS CREEK FIELD, WYOMING

| Agent | Duomeen T | | | Atpet 931 | | | 90% Atpet 931, 10% Duomeen T | | | 25% Duomeen T, 75% Sulphonated Castor Oil | | |
|---|---|---|---|---|---|---|---|---|---|---|---|---|
| | IFT, dynes/cm. | $K_o$, md. | Percent Change, $K_o$ | IFT, dynes/cm. | $K_o$, md. | Percent Change, $K_o$ | IFT, dynes/cm. | $K_o$, md. | Percent Change, $K_o$ | IFT, dynes/cm. | $K_o$, md. | Percent Change, $K_o$ |
| Concentration in Solvent: | | | | | | | | | | | | |
| 0.0 | 39.0 | 1.1 | 0 | 39.0 | 1.7 | 0 | 39.0 | 2.1 | 0 | 39.0 | 1.2 | 0 |
| 0.001% | 3.2 | 2.7 | +145 | 34.8 | 2.4 | +41.1 | 30.5 | 5.6 | +167 | 25.2 | 4.7 | +291 |
| 0.01% | 0.8 | 2.3 | +109 | 5.6 | 3.6 | +112 | 0.1 | 5.4 | +157 | 6.9 | 4.9 | +308 |
| 0.05% | 0.4 | 2.3 | +109 | 0.3 | 3.3 | +94.1 | 0.05 | 4.9 | +133 | 0.4 | 4.3 | +258 |
| 0.1% | 0.1 | 2.3 | +109 | 0.1 | 2.8 | +64.7 | 0.05 | 4.2 | +100 | 0.1 | 3.7 | +208 |
| 0.5% | | 0.39 | −64.5 | | 1.8 | +5.9 | 0.05 | 4.7 | +124 | | 2.5 | +108 |
| 1.0% | 0.05 | | | 0.05 | 1.6 | −5.9 | 0.05 | 3.9 | +85.7 | 0.05 | .81 | −32.5 |

The most significant conclusion to be drawn from the data in Table VI is that the maximum concentration of additive is very critical in treating this formation. In these cores, unlike the Springer sand cores, the maximum limitation on interfacial tension and the minimum limit on concentration are not so critical. For most of the additives, however, it is apparent that not much more than 0.1 percent additive should be used; certainly not over 0.5 percent.

When a well is to be treated, it is impossible to determine by any reasonably economical means whether the formations to be treated will behave like the Springer sand or the Curtis sand. Therefore, it is usually not known whether the minimum concentration limit, the maximum interfacial tension limitation, or the maximum concentration limit is to be most critical. In order to obtain effective permeability recovery without plugging the treated zone, all limitations should be observed.

Example VII

Two test cores of the Springer sand were obtained and treated in the same way as described in Example IV. One core was treated with the first proprietary compound described in Example I. The other core was treated with the second proprietary compound. This treatment was followed in each case by a treatment with 1 percent solution of Atpet 931. No flushing or reblocking was employed between treatments. The concentrations of proprietary compounds indicated were used because they are recommended by the companies offering the particular additives and services. Results are reported in Table VII.

Compound II is said to be a predominantly water-soluble aromatic sulfonate. Neither substance is very soluble in oil. As a result, considerable undissolved material remained when efforts were made to prepare solutions of the concentrations noted in Table VII. Previous experience has indicated that such insoluble material is filtered out at or near the face of the core, tending to form a relatively impermeable cake or zone. Therefore, both interfacial tension measurements and flow tests were conducted with filtered solutions of the additives. Due to the large amount of diluents and oil-insoluble materials present in the proprietary compounds, it is improbable that the actual concentrations of the compounds in the tested solutions exceeded 0.1 percent. In view of the limited solubility it is improbable that solutions of higher concentrations could be prepared. As previously noted, the concentration must exceed about 0.1 percent or good water removal often cannot be expected. This explanation of the limited effectiveness of Compound I is particularly probable in view of the very limited solubility of 2-heptadecyl imidazoline reported in Table I. Apparently, Proprietary Compound I is a good example of a material which seems to be operable from an interfacial tension measurement, but which fails to produce satisfactory water movement because not enough can be maintained in solution to satisfy the minimum concentration requirements. Proprietary Compound II obviously does not satisfy the interfacial tension requirements, and probably is not soluble to the extent of 0.1 percent. Therefore, its failure to give good permeability recovery is understandable.

Example VIII

A core 2 inches in diameter and 2 feet long was drilled in a horizontal direction from an outcrop of the Torpedo sandstone near Bartlesville, Oklahoma. This sand is classed as being largely water wet. It was mounted in a Lucite sleeve with pressure taps every 3 inches to permit following the pressure drop along the core. Opposite ends were marked X and Y. After mounting, the core was evacuated and filled with brine containing about 5000 parts per million of sodium chloride. The narrow petroleum fraction previously described was forced into end X of the core until a reasonably constant pressure drop was established between all the pressure taps at a constant overall pressure differential across the entire core. The pressure drops between the taps were then noted to permit calculation of permeabilities of the various zones.

A natural drilling mud from the High Island Field near the Gulf of Mexico coast was then forced against end Y of the core so mud filtrate and possibly some of the finely divided solids entered the core. The filter cake was occasionally removed, as would occur in a well due to scraping of well equipment such as the drill pipe. Mud injection was continued until filtrate appeared at end X. The petroleum fraction was again forced through the core from end X. The water and finely divided solids from the drilling fluid had so badly plugged the core that oil appeared at end Y only after 4 hours under a differential pressure of 75 p. s. i. g. across the core. When oil appeared, pressures at the taps were again noted and permeabilities of the core zones were calculated.

A solution of Atlas G-2854 in the narrow petroleum fraction was next introduced into end Y. The concentration was about 2 percent by weight. It was believed this concentration was probably safe in this case due to the fairly high natural permeability of the core. Therefore, the high concentration was used in an effort to remove mud fines as well as water if possible. After about one pore volume of the treating solution had been injected, the direction of flow was reversed, clean petroleum fraction being injected into end X. The flow rate immediately increased and the new permeability valves were measured. The results are presented in Table VIII.

TABLE VIII

| Time of Measurement | End X | End Y |
|---|---|---|
| Original | ¹ 150 | 50 |
| After Drilling Mud | 160 | 13 |
| After Atlas G-2854 | 310 | 90 |

¹ All values are permeabilities to flow of oil in millidarcies.

An important fact to be noted is that this core was water wet and was not, therefore, subject to the usual water blocking which occurs in an oil-wet formation. Nevertheless, the drilling fluid filtrate, possibly together with some finely divided solids, was able to decrease the permeability to flow of oil to such a degree that a considerable period of time and a high pressure differential would have been required to force the water out and obtain reasonable flow rates of oil. The Atlas G-2854 obviously reduced the interfacial tension between the oil and water, permitting removal of not only the mud filtrate, but also a considerable amount of other water. In some wells the pressure differential would be adequate to blow the water out of the zone near the well. In many wells, however, such pressures are not available, or are sufficient to cause removal of the water only over an extended period of time. The well might easily be abandoned as non-productive due to an early figure of low productivity. A treatment with Atlas G-2854 would result in a commercial production rate immediately. The concentration of Atlas G-2854 was obviously too high since the water issued from the core as a tight emulsion which would undoubtedly have plugged a core of lower permeability. The test does indicate, however, the ability of my method to increase oil production from water-wet formations.

Example IX

Three wells in the Midland Farms Field of Texas were treated with Atpet 931 to stimulate production. One well was Midland Farms K #3. This well was producing about 53 barrels of oil and 5 barrels of water per day prior to treatment. About 5,000 gallons of lease crude oil containing 1% Atpet 931 were injected into this well by simply pouring the solution into the annular space between the casing and tubing. The hydraulic head of the oil was sufficient to force the solution back into the formation. After a period of 24 hours the pump was started and the production rate was measured. No noticeable increase in production occurred immediately. After 30 days, however, a production measurement indicated the well was producing 82 barrels of oil per day with no water. When Midland Farms W #2 was treated in the same way as K #3 the production immediately increased from 12 to 40 barrels of oil per day. Four months later the production had gradually increased to 47 barrels per day. Midland Farms W #6 was treated in the same way as the other two wells and indicated no appreciable immediate increase in production. Three months after treatment, however, the production had increased from 39 to 59 barrels of oil per day.

Example X

The Jordan A #4 in the Winfield Field near Abilene, Texas, failed to produce commercially from the Mississippian pay section on swabbing. The section was then treated with 35 gallons of Atpet 931 in 3,500 gallons of crude oil. Upon resumption of swabbing the Mississipian produced at a rate of 80 barrels of oil per day.

Example XI

The Candelari B #1 in the Clinton Field near Houston, Texas, sanded up and was worked over. The workover consisted of cleaning out the well bore, squeezing perforations to shut out water, drilling out the cement, and reperforating. After workover the well was swabbed for several days with negligible results. A check for sand showed the well to be sanded up several feet above the top perforations. The sand was washed out and the formation was squeezed with 200 barrels of oil. Two days of swabbing again failed to restore production. The well was then treated with about 20 gallons of Atpet 931 in about 2,000 gallons of oil. The solution was pumped into the formation under a maximum pressure of 1,050 p. s. i. g. Upon swabbing for two days 1,700 feet of oil appeared in the well and the casing pressure rose to 375 p. s. i. g. Upon washing the sand out again the well began to flow. At last report it was producing about 116 barrels of oil and 3 barrels of water per day.

Example XII

A gas injection well in the Midland Farms near Andrews, Texas, would take no gas at 1,400 p. s. i. g. The well was treated with 50 gallons of Atpet 931 and 5,000 gallons of oil. After removal of the oil it was found that the well would take 200 MCF per day at 500 p. s. i. g.

Example XIII

Another example of the delayed action of Atpet 931 was observed in the treatment of H. Moore C #21 in the Hastings area near Houston, Texas. This well was treated with 10 gallons of Atpet 931 in about 1,000 gallons of oil. The injection pressure varied between about 350 and 450 p. s. i. g. After 18 hours shut-in time the production was found to have increased from 30 to 40 barrels of oil per day. A test one month later showed the well to be producing about 53 barrels of oil per day.

Example XIV

The J. W. Ashby #1 in the East Texas Field had been shut down for about two years due to failure of numerous workovers to increase production to an economic level. An oil solution containing about 1 percent of Atpet 931 was injected into the producing zone of this well and was followed by a 4,200 gallon 6,000 pound sand-oil treatment with an overflush of 175 barrels of lease oil. The well is now producing at an apparently stabilized rate of approximately 6 barrels of oil per day. Continued production of the well is now considered economically justified.

The Jobe #1 Well in the East Texas Field was also treated with Atpet 931 before fracturing. This well was treated with about 13 gallons of Atpet 931 and about 1,000 gallons of oil, this solution being followed into the formation by 4,000 pounds of sand in 4,000 gallons of lease oil. Before treatment the production was about three barrels of oil per day. After treatment the production rate increased to about 47 barrels of oil per day.

Example XV

The Jordan A #3 in the Winfield Field near Abilene, Texas, was first acidized without increasing production from the original 20 barrels per day. It was then treated by means of an oil squeeze operation, the oil containing one of the commercially available oil squeeze additives. Again no increase in production resulted. The well was then treated by a fracturing operation. Even this treatment failed to cause the production to increase. The well was then squeezed with oil containing about 1 percent Atpet 931. After this treatment the production was found to have increased to about 30 barrels of oil per day.

Example XVI

The Montgomery-Davies Q #2 in the Levelland Field near Levelland, Texas, had several producing zones. The lower two zones were completed by acidizing. The bottom zone was treated with 4,000 gallons of hydrochloric acid solution. The acid water recovery rate by swabbing dropped to only 0.25 barrel per hour after recovering about 1,000 gallons of the total acid water. This zone was then treated with 20 gallons Atpet 931 in 2,000 gallons of oil in an effort to recover the remaining 3,000 gallons of water. After this treatment the acid recovery rate increased to more than 1 barrel per hour and 2,000 gallons of the remaining water was quickly recovered. The other zone in the well was treated with 3,500 gallons of acid preceded by 10 gallons of Atpet 931 in 1,000 gallons of oil and was followed by about 12 gallons of Atpet 931 in about 1,200 gallons of oil. The same zone was similarly treated in the M. P. Davies "P" #4, an offset well, except that no Atpet 931 was used. About 1,300 gallons of spent acid water was swabbed from the well treated with Atpet 931 before the recovery rate dropped too low to justify further swabbing. In the offset well only about 600 gallons of spent acid water was recovered.

Example XVII

Two wells in the Goldsmith Field near Odessa, Texas, were fractured by use of about 3,000 gallons of jellied acid containing about ½ pound of sand per gallon. The production of one well was increased from about 8 to about 75 barrels of oil per day. In the other well the production dropped from about 37 to about 28 barrels of oil per day. The second well as treated with 110 gallons of Atpet 931 in about 4,000 gallons of oil in an effort to remove the water block which had apparently been established by the spent acid. Upon returning the well to production the well averaged about 78 barrels of oil per day for four days and finally stabilized at about 66 barrels of oil per day.

From the above description it will be apparent that I have accomplished the objects of my invention. Oil-squeeze methods and additives have been described which increase the productivities of oil-bearing and gas-producing formations to a greater extent than presently available methods and additives without danger of plugging the producing zones. The methods and additives have been shown to be effective in treating both oil-wet and water-wet formations to cause rapid removal of water from such formations.

I claim:

1. A method for treating an oil-bearing formation penetrated by a well comprising injecting into the well and then into said formation a solution containing a mixture of esters formed by reaction of oxyethylated sorbitol and fatty acids, said esters containing from about 2 to 4 fatty acid molecules per molecule of oxyethylated soribtol, said fatty acids containing at least about 12 carbon atoms per molecule, and said oxyethylated sorbitol containing from about 1 to 10 moles of ethylene oxide per mole of sorbitol.

2. The method of claim 1 in which said solution is injected at a high rate and pressure almost sufficient to fracture said formation, and said solution is forced back into said formation by an oil flush having a volume at least about as great as that of said solution, whereby the water in the zone near the well is forced back away from the well, and the flush oil dilutes the solution to decrease the ability of said surface-active agent to cause movement of the water back toward the well.

3. The method of claim 1 in which said esters are the alcoholysis product of cottonseed oil and oxyethylated sorbitol, said product containing about 2 moles of cottonseed oil per mole of oxyethylated sorbitol, and said oxyethylated sorbitol containing about 6 moles of ethylene oxide per mole of sorbitol.

4. A method for treating an oil-bearing formation penetrated by a well comprising injecting into the well and then into said formation a solution containing a mixture of non-ionic surface-active agents at least 20 percent of which are esters formed by reaction of oxyethylated sorbitol and fatty acids, said esters containing from about 2 to 4 fatty acid molecules per molecule of oxyethylated sorbitol, said fatty acids containing at least about 12 carbon atoms per molecule, and said oxyethylated sorbitol containing from about 1 to 10 moles of ethylene oxide per mole of sorbitol.

5. The method of claim 1 in which water is injected into said formation before said solution is allowed to flow out of the formation into the well, said water containing salt to aid the mixture of esters in removing the water when the well is produced.

6. The method of claim 1 in which water is injected into said formation before said solution is allowed to flow out of the formation into the well, said water containing an alkaline detergent to make the formation water-wet and aid the mixture of esters in removing the water when the well is produced.

7. A method for treating an oil-bearing formation penetrated by a well comprising injecting into the well and then into said formation a solution containing a mixture of an oil soluble, nonionic surface-active agent and a cationic surface-active agent, the minor member of said mixture being at least about 5 percent by weight of said mixture, said nonionic agent being a mixture of esters formed by reaction of oxyethylated sorbitol and fatty acids, said esters containing from about 2 to about 4 fatty acid molecules per molecule of oxyethylated sorbitol, said fatty acids containing at least about 12 carbon atoms per molecule and said oxyethylated sorbitol containing from about 1 to 10 molecules of ethylene oxide per mol of sorbitol, and said cationic agent having the formula R'NHR''NH$_2$ wherein R' is a hydrocarbon radical containing at least about 12 carbon atoms and R'' is a hydrocarbon radical containing from 2 to 4 carbon atoms.

8. The method of claim 7 in which said cationic surface-active agent has the formula RNH(CH$_2$)$_3$NH$_2$ wherein R is a hydrocarbon radical containing from about 16 to 18 carbon atoms, the minor member of said mixture being at least about 5 percent by weight of said mixture.

9. A method for treating a gas producing formation penetrated by a well comprising injecting into the well and then into said formation a solution containing a mixture of esters formed by reaction of oxyethylated sorbitol and fatty acids, said esters containing from about 2 to about 4 fatty acid molecules per molecule of oxyethylated sorbitol, said fatty acids containing at least about 12 carbon atoms per molecule and said oxyethylated sorbitol containing from about 1 to 10 molecules of ethylene oxide per molecule of sorbitol and then producing the well, said mixture being dissolved in a hydrocarbon liquid containing predominantly propane and butane.

References Cited in the file of this patent

UNITED STATES PATENTS

| | | |
|---|---|---|
| 2,345,713 | Moore et al. | Apr. 4, 1944 |
| 2,369,831 | Jones et al. | Feb. 20, 1945 |
| 2,379,561 | Bennett | July 3, 1945 |
| 2,465,237 | Larsen | Mar. 22, 1949 |
| 2,606,871 | Ten Brink | Aug. 12, 1952 |
| 2,614,635 | Williams et al. | Oct. 21, 1952 |
| 2,645,291 | Voorhees | July 14, 1953 |
| 2,669,306 | Teter et al. | Feb. 16, 1954 |
| 2,681,889 | Menaul et al. | June 22, 1954 |
| 2,721,174 | Brainerd | Oct. 18, 1955 |